(12) United States Patent
Kurosawa

(10) Patent No.: US 6,345,896 B1
(45) Date of Patent: Feb. 12, 2002

(54) PROJECTOR CAPABLE OF EASILY REPLACING AND EFFICIENTLY COOLING LIGHT SOURCE

(75) Inventor: Shogo Kurosawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/497,478

(22) Filed: Feb. 4, 2000

(30) Foreign Application Priority Data

Feb. 19, 1999 (JP) ............................................ 11-041680

(51) Int. Cl.⁷ ........................ G03B 21/22; G03B 21/00; G03B 21/16; G03B 21/18; G02F 1/1335
(52) U.S. Cl. ........................ 353/119; 353/122; 353/52; 353/56; 353/57; 353/58; 353/74; 349/5; 349/6; 349/7; 349/8
(58) Field of Search ................................ 353/119, 122, 353/52, 56, 57, 58, 74; 349/5, 6, 7, 8

(56) References Cited

U.S. PATENT DOCUMENTS

| | | |
|---|---|---|
| 5,296,883 A | 3/1994 | Park et al. |
| 5,347,324 A | 9/1994 | Sasaki et al. |
| 5,639,152 A | 6/1997 | Nelson |
| 5,806,950 A | 9/1998 | Gale et al. |
| 5,820,242 A | 10/1998 | Rodriquez et al. |
| 5,855,488 A * | 1/1999 | Heintz et al. ............... 439/310 |

* cited by examiner

Primary Examiner—Russell Adams
Assistant Examiner—Melissa J. Koval
(74) Attorney, Agent, or Firm—Oliff & Berridge, PLC

(57) ABSTRACT

The invention provides a projector capable of easily replacing and efficiently cooling a light source, and capable of facilitating a reduction in the size of the projector. An exhaust fan adjacent to a light source lamp is mounted to a replacement cover so as to be removed from the main body of the projector together with the replacement cover. For this reason, by only removing the replacement cover, the light source lamp can be easily attached and detached together with the replacement cover unit. In addition, since it is not necessary to separately secure a special space for sliding the replacement cover unit, other components except the exhaust fan can be disposed closely to the periphery of the unit, and the size of the projector can be further reduced. Furthermore, when the replacement cover is closed, the exhaust fan is positioned closer to the replacement cover unit, so that a light source device in the unit can be efficiently cooled.

24 Claims, 8 Drawing Sheets

PROJECTOR CAPABLE OF EASILY REPLACING AND EFFICIENTLY COOLING LIGHT SOURCE

BACKGROUND OF THE INVENTION

1. Field of Invention

The present invention relates to a projector which includes a light source, an electro-optical device for forming an optical image by a light emitted from the light source according to image information, a projection lens for enlarging and projecting the image formed by the electro-optical device, a fan for drawing external air into the main body or for exhausting air inside the main body to the outside, and a housing for covering the main body.

2. Description of Related Art

Hitherto, a projector has been known which includes a light source unit having a light source, an electro-optical device for forming an optical image by a light emitted from the light source according to image information, and a projection lens for enlarging and projecting the image formed by the electro-optical device. Such a projector have been widely used for multimedia presentations at conferences, academic meetings, exhibitions, and the like.

While the projector is sometimes kept installed in a conference room or the like for a presentation, it is sometimes brought in as necessary, or is stored in another place after use. Therefore, a reduction in size of the projector is promoted to facilitate transportation. In addition, in order to improve visibility of the image displayed by the projector, an increase in brightness of the light source is facilitated.

In such a projector in which a reduction in size and an increase in brightness of the light source are facilitated, efficient cooling of the interior of the projector is a problem from the viewpoints of dense provision of components inside the device associated with a reduction in size and the elevation in temperature inside the device associated with an increase in brightness. In particular, while the light source for emitting light is composed of an arc discharge lamp, such as a metal halide lamp or a xenon lamp, the light source most readily heats up among the components inside the device, and it is important to efficiently cool the light source. Therefore, according to a conventional projector, a fan for drawing or exhausting cooling air is disposed near the light source so as to ensure cooling of the light source by a large volume of cooling air.

On the other hand, since the light source has a finite service life, it must be replaced. Hitherto, in the operation for replacing the light source, a light source-replacement cover has been provided at a part of an outer casing, and a light source unit including the light source is removed from the device after opening the light source-replacement cover.

In the case where the light source-replacement cover is opened to remove the light source, other components must be disposed so as not to interfere with the replacement of the light source. Thus, the disposition of the components around the light source is restricted.

That is, while the above-described fan is an example of a component disposed on the periphery of the light source, it is difficult to effectively use the peripheral area around the light source as a space for disposing the components other than the light source, resulting in problems in reducing the size of the device.

In addition, when priority is given to a reduction in size of the device, other components may be disposed around the light source. In such a case, the replacement operation requires significant labor such that other components must be removed after the light source-replacement cover has been removed, and then the light source must be replaced.

SUMMARY OF THE INVENTION

It is an object of the present invention to provide a projector capable of easily replacing and efficiently cooling a light source, and capable of facilitating a reduction in size of the device.

A projector according to the present invention includes a light source, an electro-optical device for forming an optical image by a light emitted from the light source according to image information, a projection lens for enlarging and projecting the image formed by the electro-optical device, a fan for drawing external air into the main body or for exhausting air inside the main body to the outside, and an outer casing for covering the main body. The light source may be attachable to and detachable from the main body via a light source-replacement cover. The light source-replacement cover may include a part of the outer casing and may have an ventilation hole for drawing or exhausting air provided therein, and the fan integrally mounted thereto.

According to the present invention as described above, the fan that is originally disposed near the light source may be integrally mounted to the light source-replacement cover. Therefore, by only opening the light source-replacement cover, the light source can be easily attached and detached via the space formed thereby. In addition, it is not necessary to separately secure the special space for replacing the light source in the device. Therefore, other components except the fan can be disposed near the periphery of the light source, and layout efficiency can be improved to reduce the size of the device. Also, since the fan is brought near the light source as usual when the light source-replacement cover is closed, the light source can be efficiently cooled.

The light source-replacement cover may be opened and closed by being removed completely from the main body or the outer casing, or may be opened and closed by being rotatably supported by the main body or the outer casing, for example, in the foregoing projector, the light source-replacement cover may desirably be provided on the side face of the outer casing.

In order to increase the brightness of the displayed image, a plurality of projectors may be used in a stacked state. In such a case, if the light source-replacement cover is provided on the upper surface or the lower surface of the outer casing, when replacing the light source of one projector, the opening and closing of the light source-replacement cover may be disturbed by the other projector. Therefore, the stacked projectors must be separated, and the separation operation and various adjusting operations after stacking the projectors again require significant labor.

In the present invention, however, since the light source-replacement cover is provided on the side face of the outer casing, the light source-replacement cover can be opened and closed with the projectors stacked, and replacement operation of the light source can be easily performed.

In addition, in the projector of the present invention, the light source-replacement cover may preferably be formed by a heat insulating material, and the outer casing except the light source-replacement cover may preferably be made of metal.

In such a case, since the light source-replacement cover has a thermal insulating property, from the viewpoint of the handling safety, the replacement cover can be used at a section that is more likely to heat up as compared to a case where it is made of metal. For this reason, not only an intake fan but also an exhaust fan that is more likely to heat up, can be mounted to the light source-replacement cover.

On the other hand, the outer casing except the light source-replacement cover is made of metal, whereby rigidity of the overall outer casing can be improved.

Furthermore, in the projector of the present invention, a direction of insertion and extraction of a connector on the side of a power supply and a connector on the side of the light source provided in the main body may preferably be the same as a direction of attachment and detachment of the light source to and from the main body.

In such a case, the attachment and detachment of the light source and the insertion and extraction of the connectors can be effected simultaneously. Therefore, an electrical connection between the light source and the power supply can be easily and rapidly established.

In the projector of the present invention, an electric power-supplying line to the fan may preferably be electrically cut off and conducted according to opening and closing of the light source-replacement cover. That is, since the electric power-supplying line to the fan is cut off at the same time the light source-replacement cover is opened, the fan can be securely prevented from being erroneously operated during replacement operation of the light source.

In the foregoing, the fan may be provided with a fan guard on the opposite side of the light source-replacement cover, whereby the safety during the replacement operation of the light source (in particular, during the opening and closing of the light source-replacement cover) is improved.

DETAILED DESCRIPTION OF PREFERRED EMBODIMENTS

Figure 1:
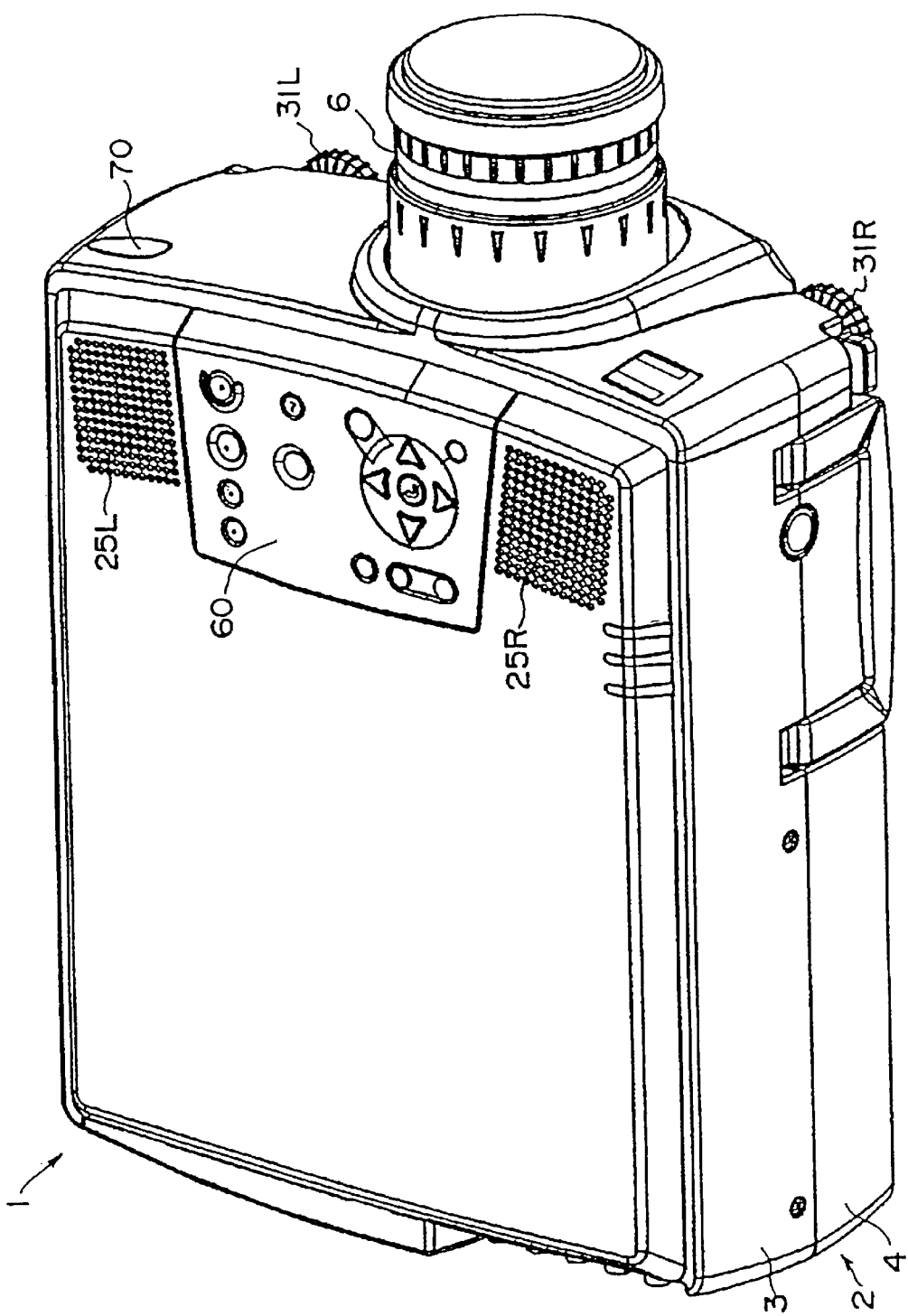
FIG. 1 is an outward perspective view of a projector according to an embodiment of the present invention, as viewed from the top side.
Figure 2:
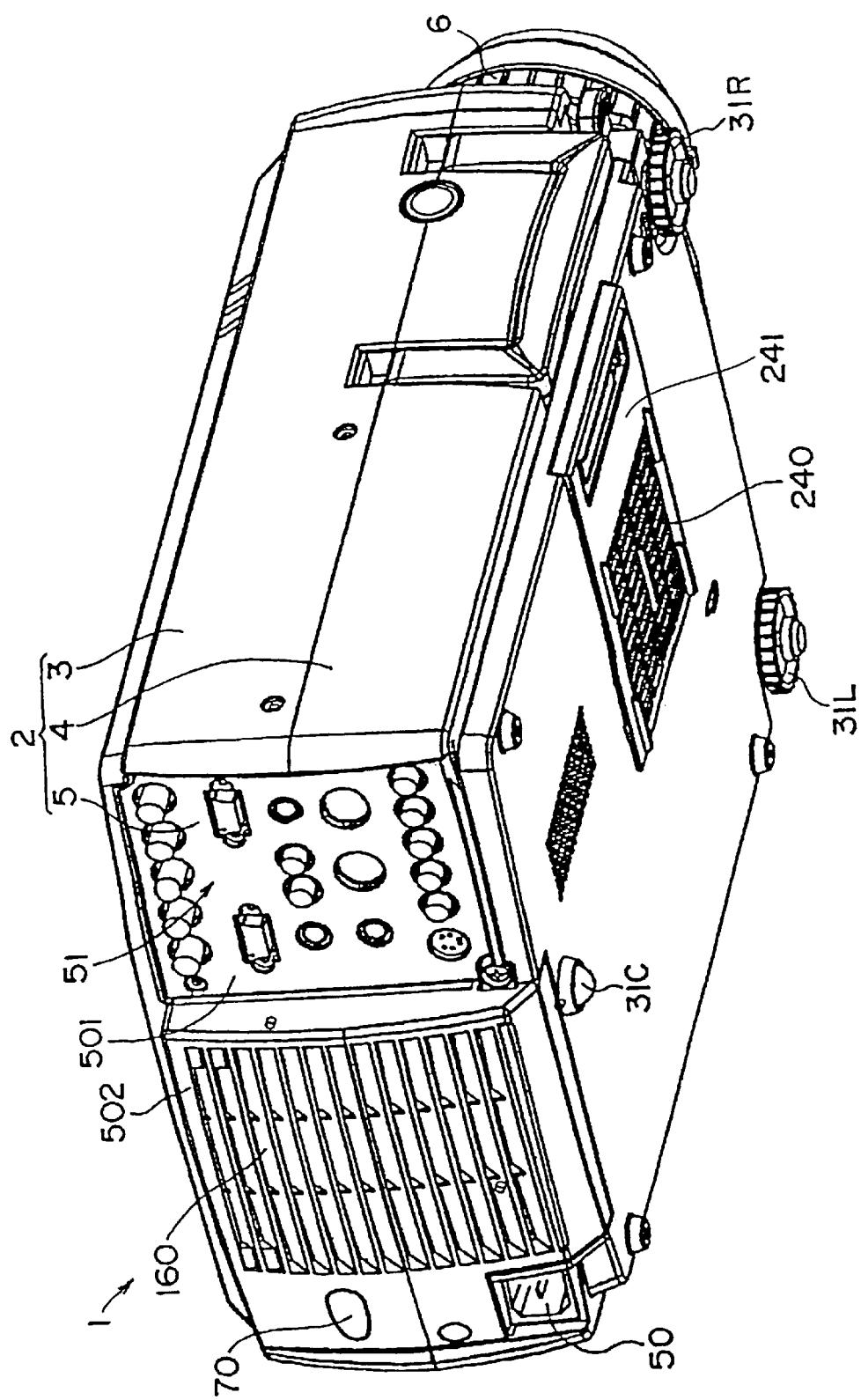
FIG. 2 is an outward perspective view of the projector in one embodiment, as viewed from the bottom side.

The embodiments of the present invention will now be described with reference to the drawings.
(1) Overall Configuration of the Device FIGS. 1 and 2 are schematic perspective views of a projector 1 according to one embodiment. FIG. 1 is a perspective view as viewed from the top side, and FIG. 2 is a perspective view as viewed from the bottom side.

The projector 1 is of a type that separates a light emitted from a light source lamp serving as a light source into three primary colors of red (R), green (G), and blue (B), modulates these color lights according to image information through liquid crystal panels constituting an electro-optical device, synthesizes the modulated lights of respective colors by a prism (color-synthesizing optical system), and enlarges and displays the synthesized light onto a projection plane via a projection lens 6. Components are accommodated in an outer casing 2 except a part of the projection lens 6.
(2) Structure of Outer Casing The outer casing 2 basically includes of an upper casing 3 for covering the top face of the device, a lower casing 4 constituting the bottom face of the device, and a rear casing 5 (FIG. 2) for covering a rear face, and is made of metal, such as magnesium, except that the rear casing 5 is made of resin.

As shown in FIG. 1, many communication holes 25R and 25L for speakers are formed at left and right ends of the front side of the top face of the upper casing 3. In addition, a control panel 60 for adjusting image quality and the like of the projector 1 is provided between the communication holes 25R and 25L. Furthermore, a light-receiving section 70 is provided at the upper right portion of the front face of the upper casing 3 so as to receive an optical signal from a remote controller that is not shown in the figure.

As shown in FIG. 2, in substantially a center of the bottom face of the lower casing 4, there is provided an air inlet 240 for taking in cooling air for cooling the inside of the device. The air inlet 240 is provided in a filter replacement cover 241 made of resin, and the filter replacement cover 241 is attached to and detached from the side face of the lower casing 4, whereby an internal filter can be replaced.

In addition, the bottom face of the lower casing 4 is provided with, as shown in FIG. 2, feet 31R and 31L at the left and right front end corners thereof, and a foot 31C at substantially the rear end center. By controlling the amount of vertical extension or retraction of the feet 31R and 31L, the inclination of the display screen can be changed.

Figure 3:
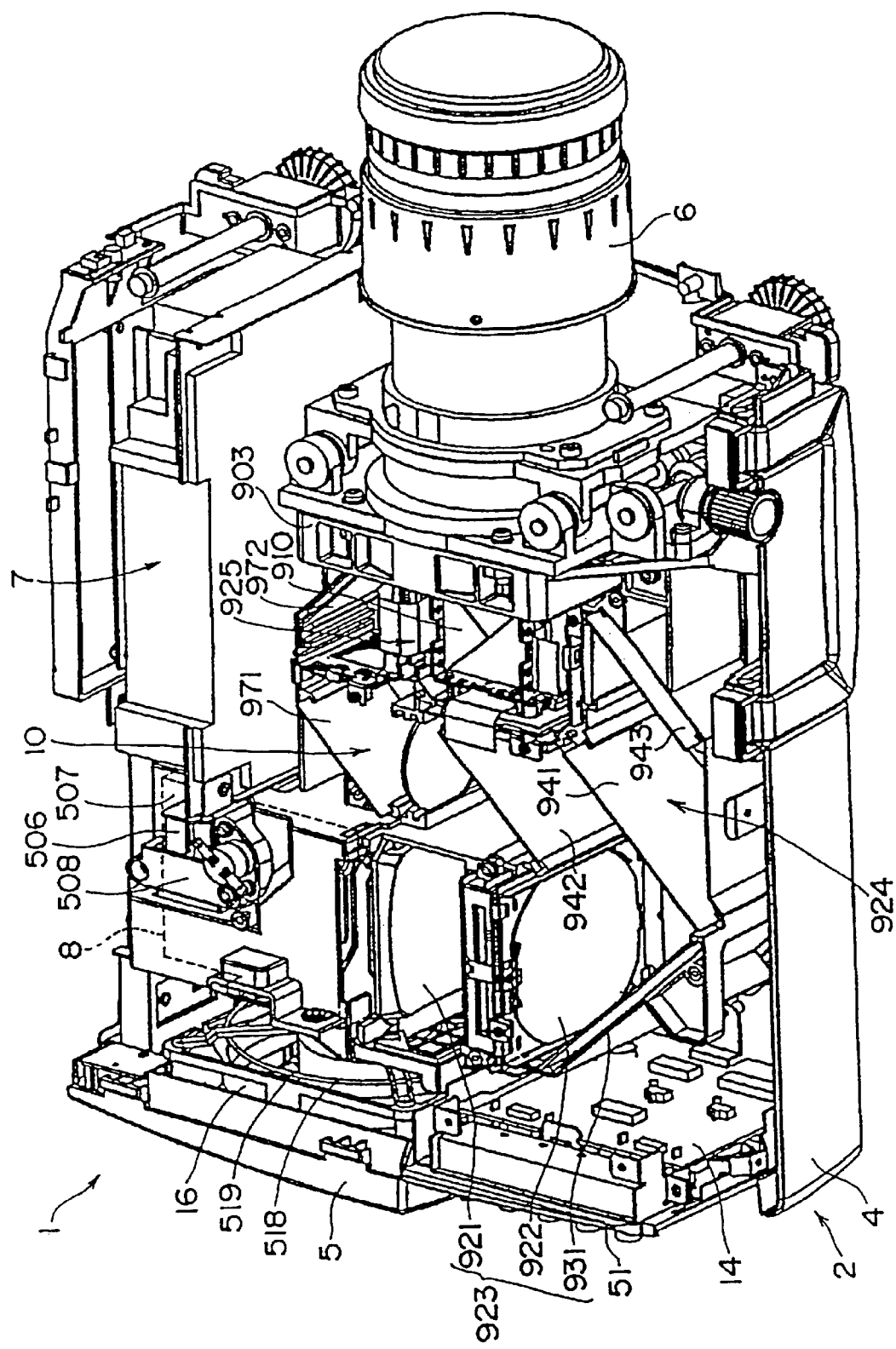
FIG. 3 is a perspective view showing the internal structure of the projector in one embodiment.

As shown in FIG. 2, an AC inlet 50 for supplying external electric power and various types of input-output terminals 51 are disposed on the rear casing 5, and an air outlet 160 serving as a ventilation hole for exhausting air inside the device is formed adjacent to the input-output terminals 51. The rear casing 5 is also provided with the light-receiving section 70 similarly to the upper casing 3.
(3) Internal Structure of the Device FIG. 3 shows the internal structure of the projector 1.

As shown in this figure, a power supply unit 7 serving as a power supply disposed on one side of a projection lens 6, a light source lamp unit 8 serving as a light source unit disposed rearward of the power supply unit 7, an optical unit 10 constituting an optical system, a driver board (not shown) for driving an electro-optical device 925 provided in the unit 10, and a main board (not shown) for controlling the overall device 1 are accommodated in the device 1.

The power supply unit 7 transforms electric power from the AC inlet 50 to supply the power to the light source lamp unit 8, intake fans (not shown) disposed below or both above and below the driver board, the main board, the electro-optical device 925, and an exhaust fan 16 disposed rearward of the light source lamp unit 8, and includes a lamp-driving board for driving a light source lamp 181 of the light source lamp unit 8 (shown in FIG. 4), in addition to a power-supply circuit board having a power supply filter, a transformer, a rectifying circuit, a smoothing circuit, and a voltage-regulating circuit, etc. formed thereon.

Figure 4:
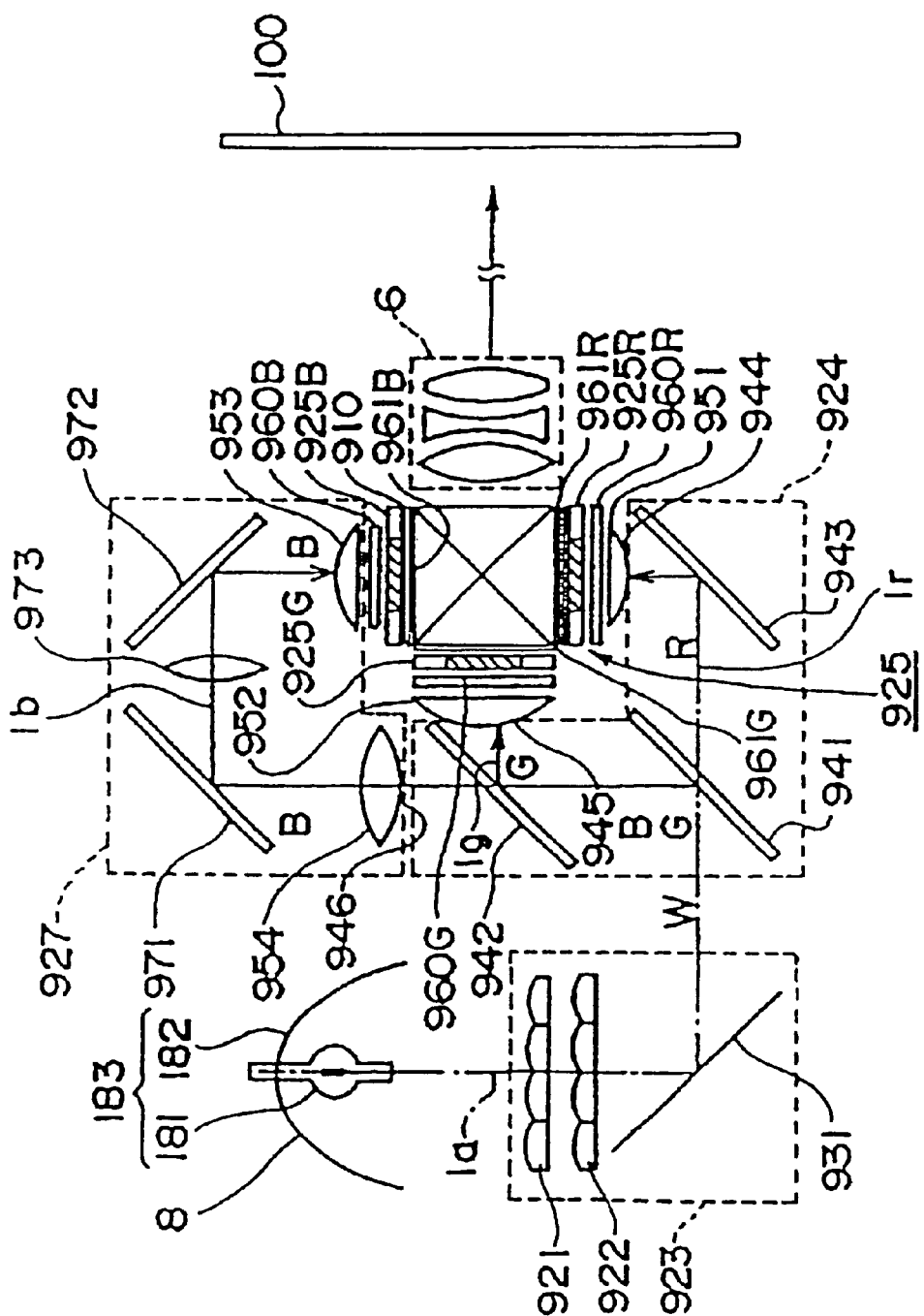
FIG. 4 is a schematic diagram for the explanation of a structure of an optical system in one embodiment.

The light source lamp unit 8 includes a light source portion of the projector 1, and includes, as shown in FIG. 4, the light source device 183 including a light source lamp 181 and a reflector 182, and a lamp housing 184 (FIG. 6) for accommodating the light source device 183. Such a light source lamp unit 8 is cooled by cooling air from the above-described intake fans and cooling air drawn from a clearance between the outer casing 2 and the projection lens 6. The cooling air first cools the electro-optical device 925 and the power supply unit 7 immediately after being drawn, then flows rearward so as to cool almost all the area inside the device 1, and most of the cooling air finally passes through the light source lamp unit 8 to be exhausted by the exhaust fan 16 provided behind the light source lamp unit 8. Therefore, the light source lamp unit 8 is disposed just in front of the exhaust fan 16, whereby the light source device 183 inside thereof can be efficiently cooled by a large volume of the cooling air.

The optical unit 10 is a unit for optically processing a light emitted from the light source lamp unit 8 to form an optical image corresponding to image information, and includes an illuminating optical system 923, a color separation optical system 924, an electro-optical device 925, and a prism unit 910 serving as a color-synthesizing optical system. The optical elements of the optical unit 10 other than the electro-optical device 925 and the prism unit 910 are vertically held between upper and lower light guides (not shown). The upper light guide and the lower light guide are integrally formed, and are fixed by fixing screws adjacent to the lower casing 4. In addition, these light guides are similarly fixed by fixing screws adjacent to the prism unit 910.

Figure 5:
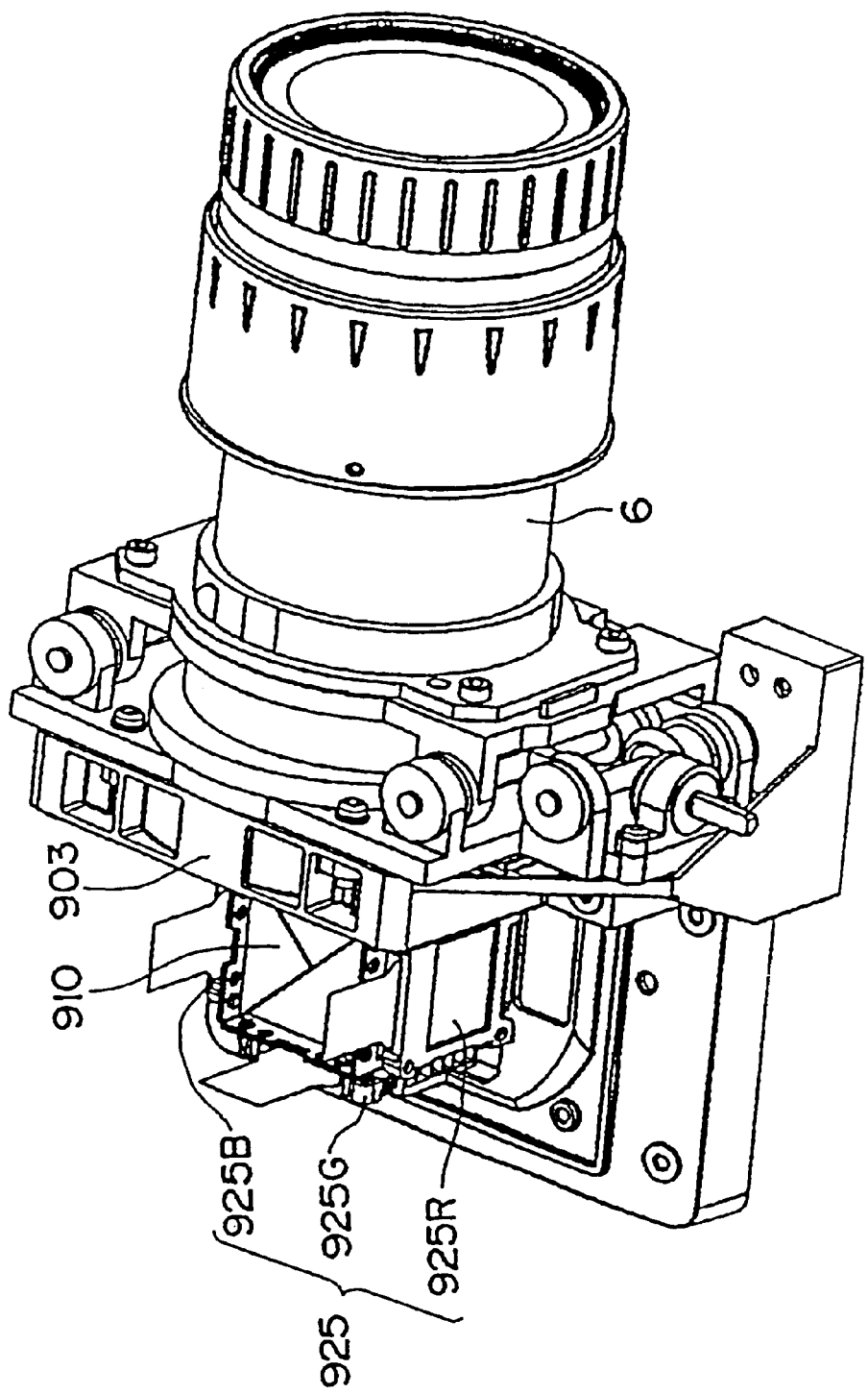
FIG. 5 is a perspective view showing the components of one embodiment.

The prism unit 910 shaped like a rectangular parallelepiped is, as shown in FIG. 5, fixed by fixing screws to a back face of a head body 903 having substantially an L-shaped side face that is composed of an integrally molded article of magnesium. In addition, liquid crystal panels 925R, 925G, and 925B constituting the electro-optical device 925 are fixed via fixing members to three side faces of the prism unit 910.

The driver board is intended for driving and controlling the liquid crystal panels 925R, 925G, and 925B of the electro-optical device 925, and is disposed above the optical unit 10.

The main board has a control circuit formed thereon for controlling the overall projector 1, and is disposed above the driver board. Such a main board is electrically connected to the driver board and the control panel 60.

(4) Structure of Optical System

Next, the structure of an optical system of the projector 1, that is, the optical unit 10 will be described with reference to a schematic diagram shown in FIG. 4.

As described above, the optical unit 10 includes the illuminating optical system 923 for producing a uniform in-plane illuminance distribution of a light (W) from the light source lamp unit 8, the color separation optical system 924 for separating the light (W) from the illuminating optical system 923 into red (R), green (G), and blue (B), the electro-optical device 925 for modulating color lights R, G, and B according to image information, and the prism unit 910 serving as a color-synthesizing optical system for synthesizing the modulated color lights.

The illuminating optical system 923 includes a first lens plate 921, a second lens plate 922 disposed on the emitting side of the first lens plate 921, and a reflecting mirror 931 for bending an optical axis 1a of the light W emitted from the light source lamp unit 8 toward the front of the device 1.

The first lens plate 921 has a plurality of rectangular lenses arranged in the form of a matrix, divides the light emitted from the light source into a plurality of partial lights, and condenses the partial lights near the second lens plate 922.

The second lens plate 922 has a plurality of rectangular lenses arranged in the form of a matrix, and has the function of superimposing the partial lights emitted from the first lens plate 921 onto the liquid crystal panels 925R, 925G, and 925B (described hereinbelow) constituting the electro-optical device 925.

In this way, according to the projector 1 of this embodiment, the liquid crystal panels 925R, 925G, and 925B can be illuminated with light having substantially uniform illuminance by the illuminating optical system 923, so that a projected image having no illuminance variations can be obtained.

The color separation optical system 924 consists of a blue-and-green-reflecting dichroic mirror 941, a green-reflecting dichroic mirror 942, and a reflecting mirror 943. First, a blue light B and a green light G contained in the light W emitted from the illuminating optical system 923 are reflected at right angles by the blue-and-green-reflecting dichroic mirror 941, and are directed toward the green-reflecting dichroic mirror 942.

A red light R passes through the blue-and-green-reflecting dichroic mirror 941, is reflected at right angles by the rearward reflecting mirror 943, and is emitted from an emitting section 944 of the red light R toward the prism unit 910.

Next, only the green light G in the blue and green lights B and G reflected by the blue-and-green-reflecting dichroic mirror 941 is reflected at right angles by the green-reflecting dichroic mirror 942, and is emitted from an emitting section 945 of the green light G toward the prism unit 910.

The blue light B passing through the green-reflecting dichroic mirror 942 is emitted from an emitting section 946 of the blue light B toward a relay optical system 927. In this embodiment, all the distances between the emitting section for the light W of the illuminating optical system and the emitting sections 944, 945, and 946 of the color lights R, G, and B in the color separation optical system 924 are set to be equal.

Condenser lenses 951 and 952 are disposed on emitting sides of the emitting sections 944 and 945 of the red and green lights R and G of the color separation optical system 924. Therefore, the red and green lights R and G emitted from the emitting sections 944 and 945 enter the condenser lenses 951 and 952, where they are collimated.

The thus-collimated red and green lights pass through incident-side polarizers 960R, 960G, and 960B, and enter the liquid crystal panels 925R and 925G serving as optical modulation devices, where they are modulated and given image information corresponding to light of respective colors. That is, these liquid crystal panels 925R and 925G are subjected to switching control according to image information by the driver board, whereby the light of respective colors passed therethrough is modulated.

On the other hand, the blue light B is guided to the corresponding liquid crystal panel 925B via the relay optical system 927, where it is similarly modulated according to image information. As the liquid crystal panels 925R, 925G, and 925B of this embodiment, for example, liquid crystal panels may be employed that use a polysilicon TFT as a switching element.

The relay optical system 927 consists of a condenser lens 954 disposed on an emitting side of the emitting section 946 of the blue light B, an incident-side reflecting mirror 971, an emitting-side reflecting mirror 972, an intermediate lens 973 disposed between the reflecting mirrors, and a condenser lens 953 disposed before the liquid crystal panel 925B, and the blue light B emitted from the condenser lens 953 passes through the incident-side polarizer 960B to enter the liquid crystal panel 925B, where it is modulated.

In this case, the optical axis 1a of the light W, and optical axes 1r, 1g, and 1b of the color lights R, G, and B are formed in the same plane. The blue light B has the longest optical path length, that is, the distance between the light source lamp 181 and the liquid crystal panel for the blue light B is the longest and therefore, the amount of light of the light to be lost is the largest. The light loss can, however, be restricted by interposing the relay optical system 927 therebetween.

Next, the color lights R, G, and B modulated through the liquid crystal panels 925R, 925G, and 925B pass through emitting-side polarizers 961R, 961G, and 961B to be allowed to enter the prism unit 910, where they are synthesized. A color image synthesized by the prism unit 910 is enlarged and projected via the projection lens 6 onto a projection plane 100 located at a predetermined position.

(5) Removing Structure of Light Source Lamp Unit

Figure 6:
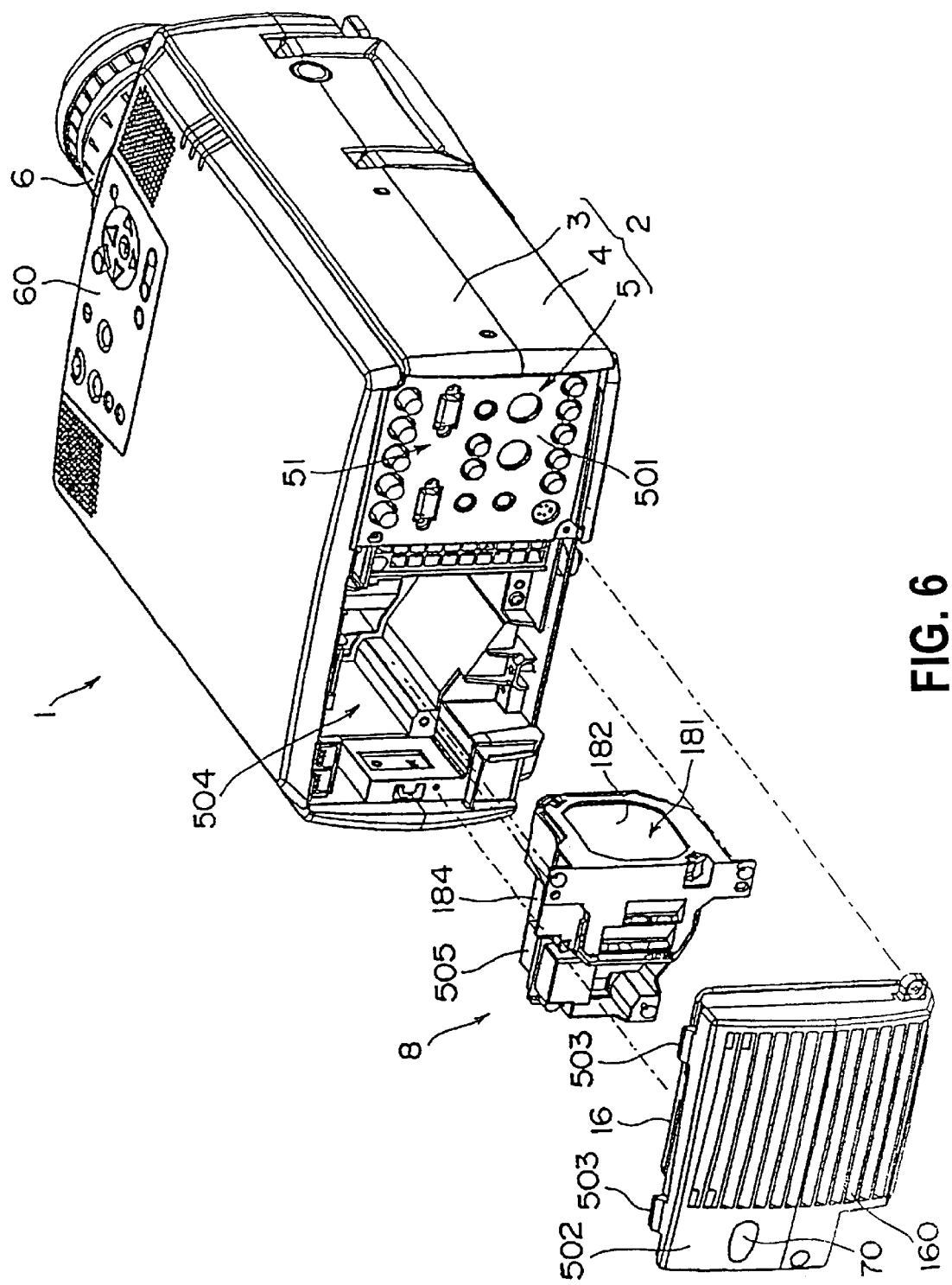
FIG. 6 is an exploded perspective view of the projector in one embodiment, as viewed from the rear side.

Referring to FIG. 6, the rear casing 5 made of resin consists of a fixing section 501 corresponding to the input-output terminals 51 and a light source lamp-replacement cover 502 provided with the air outlet 160 and the light-receiving section 70. The light source lamp-replacement cover 502 can be easily removed from the main body of the device 1 and opened by removing lower two screws and by removing upper two holding portions 503 from the upper casing 3.

Figure 7:
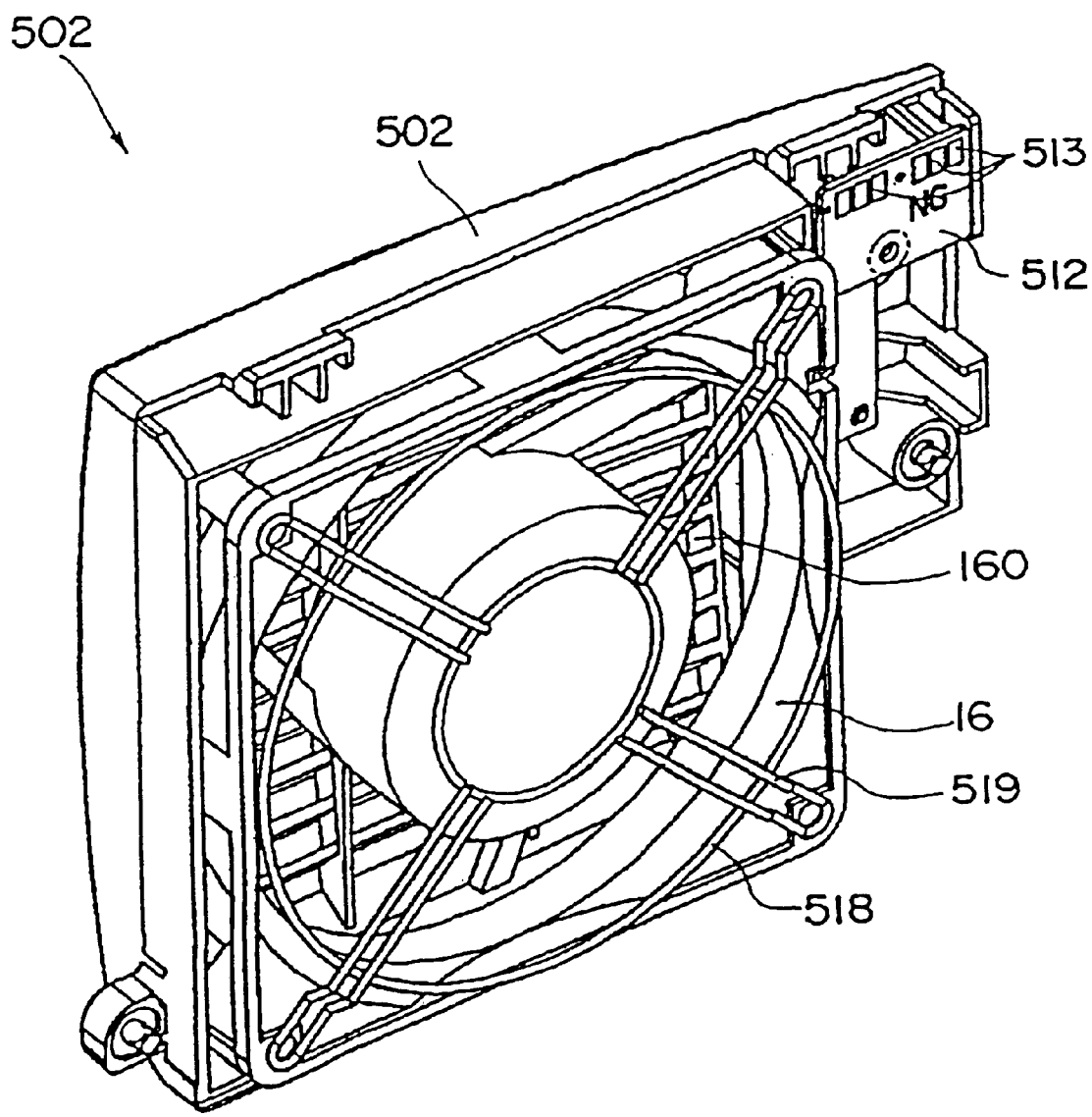
FIG. 7 is a perspective view showing other components of one embodiment.

To such a light source lamp-replacement cover 502, the exhaust fan 16 is integrally mounted, as shown in FIG. 7. That is, when the light source lamp-replacement cover 502 is removed from the main body of the device 1, the exhaust fan 16 is also removed, and a space 504 facing the internal light source lamp unit 8 is formed on the rear side face of the device 1. By sliding the light source lamp unit 8 back and forth via the space 504, the light source lamp unit 8 can be attached to and detached from the device body 1 so as to be replaced.

In addition, the light source lamp unit 8 and the power supply unit 7 located immediately before the light source lamp unit 8 are electrically connected by the fitting of a connector 505 formed on the lamp housing 184 and a connector 506 held by a holding member 508 on an accommodating section 507, shown in FIG. 3. In this case, a direction of insertion and extraction of the connectors 505 and 506 is the same as a sliding direction of the light source lamp unit 8, and the attachment and detachment of the light source lamp unit 8 and the insertion and extraction of the connectors 505 and 506 can be effected simultaneously.

Figure 8:
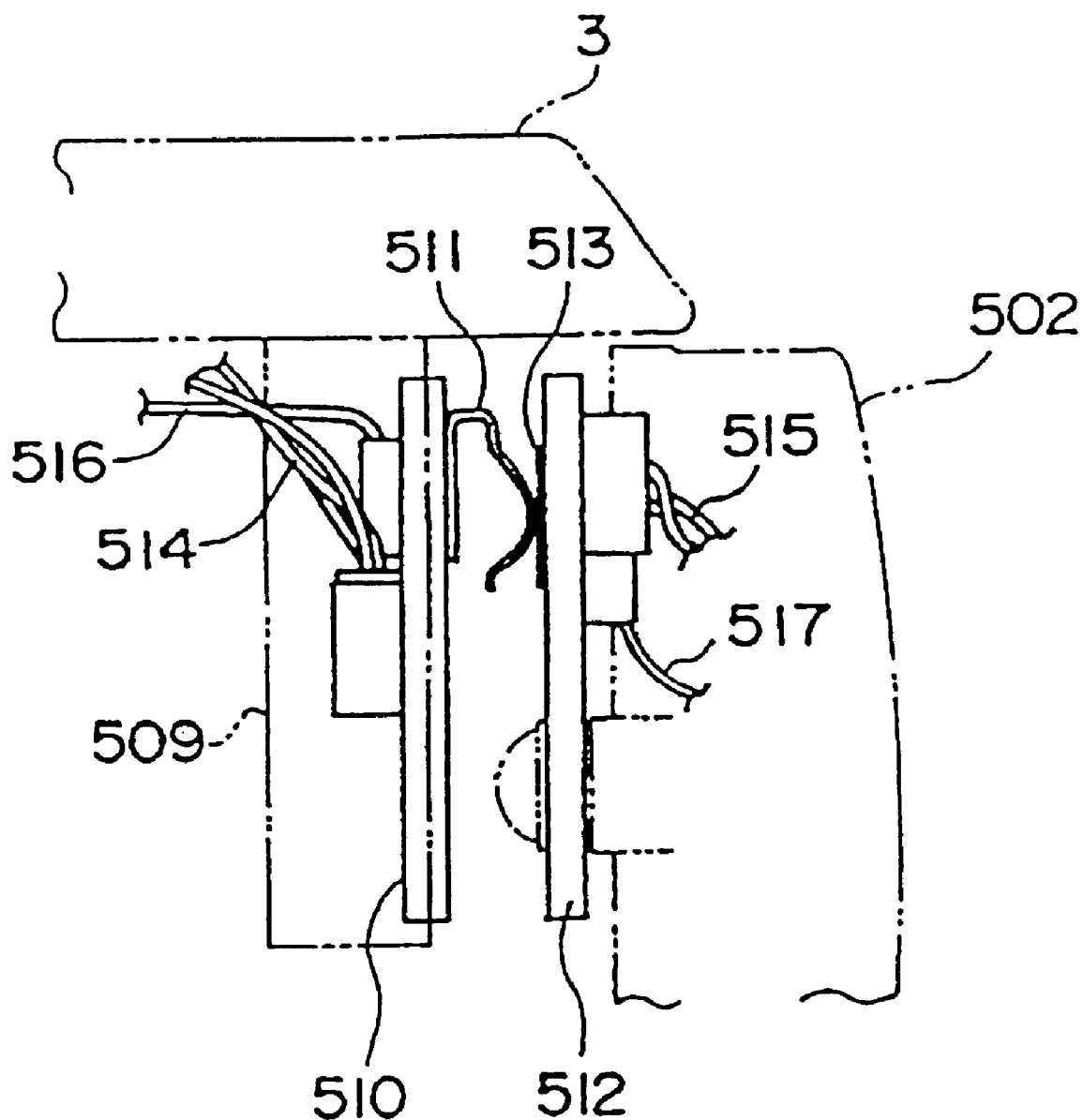
FIG. 8 is a side view showing a principal part of one embodiment.

Furthermore, the power supply unit 7 and the exhaust fan 16 are electrically joined by the press-contact of a plurality of leaf spring-type terminals 511 (only one thereof is shown in FIG. 8) on a circuit board 510 mounted to a mounting section 509 of the upper casing 3 and a plurality of conductive patterns 513 on a circuit board 512 fixed by screws to the light source lamp-replacement cover 502, as shown in FIGS. 7 and 8. In other words, an electric power-supplying line is formed by the circuit boards 510 and 512 including the terminals 511 and the conductive patterns 513, and a cable 514 on the side of the power supply unit 7 and a cable 515 on the side of the exhaust fan 16 connected thereto. The electric power-supplying line is cut off/conducted by the separation/contact of the terminals 511 and the conductive patterns 513 with opening and closing of the light source lamp-replacement cover 502 and the main body of the device 1. Incidentally, FPCs (flexible printed cables) 516 and 517, and the like, are connected to the circuit boards 510 and 512, whereby a signal transmitting lines of the light-receiving section 70 provided on the light source lamp-replacement cover 502 and the main board are formed.

A fan guard 519 having a plurality of rings 518 (only one thereof is shown in FIGS. 3 and 7) of different diameters disposed reticulately thereon is provided on the exhaust fan 16 on the opposite side of the light source lamp-replacement cover 502, whereby handling safety of the exhaust fan 16 removed together with the light source lamp-replacement cover 502 can be improved.

(6) Advantages of the Embodiment

The above-described embodiment provides the following advantages. That is, in the projector 1, since the exhaust fan 16 disposed near the light source lamp unit 8 is integrally mounted to the light source lamp-replacement cover 502, by only opening the light source lamp-replacement cover 502, the light source lamp unit 8 can be easily attached and detached via the space 504 formed thereby.

In addition, it is not necessary to separately provide a special space for sliding the light source lamp unit 8 in the device 1. Therefore, a power supply filter and an AC inlet constituting the power supply unit 7 in addition to the exhaust fan 16 can be disposed more closely to the periphery of the light source lamp unit 8, and layout efficiency can be improved to reduce the size of the device 1.

Also, since the exhaust fan 16 comes closer to the light source lamp unit 8 when the light source lamp-replacement cover 502 is closed, the light source device 183 provided in the light source lamp unit 8 can be efficiently cooled in a normal manner.

Furthermore, the light source lamp-replacement cover 502 is a part of the rear casing 5 and is provided on the rear side face of the outer casing 2. Therefore, in a case where a plurality of projectors 1 are used in a stacked state, when replacing the light source lamp unit 8 of one projector 1, the light source lamp-replacement cover 502 can be opened and closed without being disturbed by the other projector 1. Therefore, since the light source lamp-replacement cover 502 can be opened and closed with the projectors 1 held stacked, division of the projectors 1 and adjusting operation after stacking the projectors again can be eliminated, and replacement operation of the light source lamp unit 8 can be easily performed.

In addition, the light source lamp-replacement cover 502 is made of resin, whereby it has simultaneously has heat insulation property. Therefore, even if the inner side heats up, the heat is difficult to be transmitted to the outer side. For this reason, in the case where the light source lamp-replacement cover 502 is, for example, made of metal having good thermal conductivity, if the exhaust fan 16, which is more likely to heat up, is mounted, the replacement cover 502 may heat up to the outer side to interfere with handling. However, even if such an exhaust fan 16 is mounted, the light source lamp-replacement cover 502 made of resin eliminates the danger that the outer side of the replacement cover 502 does not heat up to such an extent as to interfere with handling.

On the other hand, since the outer casing 2 except the light source lamp-replacement lamp 502 is made of metal, rigidity of the overall outer casing 2 can be improved.

Furthermore, according to the projector 1, at the electrically connected portion of the power supply unit 7 and the light source lamp unit 8, the direction of insertion and extraction of the connector 506 on the side of the power supply unit 7 and the connector 505 on the side of the light source lamp unit 8 is the same as the sliding direction of the light source lamp unit 8. Therefore, the attachment and detachment of the light source lamp unit 8 and the insertion and extraction of the connectors 505 and 506 can be effected simultaneously, and an electrical connection between the power supply unit 7 and the light source lamp unit 8 can be easily and rapidly established.

Since the electric power-supplying line from the power supply unit 7 to the exhaust fan 16 is electrically cut off/conducted according to the opening and closing of the light source lamp-replacement cover 502, the electric power-supplying line to the exhaust fan 16 can be cut off at the same time the light source lamp-replacement cover 502 is opened, and the exhaust fan 16 can be securely prevented from being erroneously operated during replacement operation of the light source lamp unit 8. In addition, in closing the light source lamp-replacement cover 502, the fitting operation of the connectors can be eliminated.

Since the exhaust fan 16 is provided with the fan guard 519 on the opposite side of the light source lamp-replacement cover 502, the safety during the replacement operation of the light source lamp unit 8 (in particular, during the opening and closing of the light source lamp-replacement cover 502) can be improved.

(7) Modifications of the Embodiment

The present invention is not limited to the above-described embodiment, and includes the following modifications.

For example, while the direction of insertion and extraction of the connector 505 on the side of the light source lamp unit 8 and the connector 506 on the side of the power supply unit 7 is the same as the sliding direction of the light source lamp unit 8 in the above embodiment, the direction is not limited thereto. That is, the direction of insertion and extraction of the connectors 505 and 506 may not be the same as the sliding direction, and these connectors 505 and 506 may be securely inserted and extracted by utilizing the space 504 formed by opening the light source lamp-replacement cover 502. However, it is preferable that the direction of insertion and extraction be the same as the sliding direction because the insertion and extraction of the connectors 505 and 506 and the sliding of the light source lamp unit 8 can be effected simultaneously.

In addition, while the light source lamp-replacement cover 502 is provided on the rear side face of the device in the above embodiment, the light source lamp-replacement cover 502 may be formed on the left side face, the right side face, or the front face of the device 1 so as to form a part of the upper casing 3 or the lower casing 4. Furthermore, the light source lamp-replacement cover 502 may be provided on the upper surface or the lower surface of the device 1 to form a part of the upper casing 3 or the lower casing 4. In short, the position where the light source lamp-replacement cover 502 is provided may be determined at random in consideration of the layout of the components inside the device 1.

However, the provision of the replacement cover 502 on the upper surface or the lower surface may cause inconveniences when a plurality of devices 1 are used in a stacked state. Therefore, the replacement cover 502 may preferably be provided on any one of the front, rear, left, and right side surfaces of the device 1.

While the exhaust fan 16 is mounted to the light source lamp-replacement cover 502 in the above embodiment, an intake fan may be mounted to the replacement cover 502, and any type of fan can be mounted according to a cooling system of the device 1.

Furthermore, while the electro-optical device 925 is composed of TFT-drive liquid crystal panels 925R, 925G, and 925B in the above embodiment, the present invention may be applied to a projector including an optical modulation device formed by another driving method.

While the electro-optical device 925 is composed of the three liquid crystal panels 925R, 925G, and 925B in the above embodiment, the present invention may be applied to an optical modulation device composed of a single or two liquid crystal panels.

In addition, while the panels constituting the electro-optical device 925 are composed of liquid crystal elements in the above embodiment, the present invention may be applied to a projector including an optical modulation device composed of device panels using plasma elements or micro-mirrors other than the liquid crystal.

Furthermore, while the electro-optical device 925 in the above embodiment is of a type that transmits and modulates lights R, G, and B, the present invention may be applied to a projector including a reflective optical modulation device which modulates while reflecting and emits incident light.

Other specific structures, shapes, and the like for carrying out the present invention may be replaced with other structures and the like as long as the object of the present invention can be achieved.

According to the present invention as described above, the fan that is originally disposed near the light source is integrally mounted to the light source-replacement cover. Therefore, by only opening the light source-replacement cover, the light source can be easily attached and detached via the space formed thereby. In addition, it is not necessary to separately secure the special space for replacing the light source in the device. Therefore, other components except the fan can be disposed near the periphery of the light source, and layout efficiency can be improved to reduce the size of the device. Also, when the light source-replacement cover is closed, since the fan is brought near the light source similarly to a conventional replacement cover, there is provided an advantage that the light source can be efficiently cooled.

What is claimed is:

1. A projector, comprising:
    a light source that emits light;
    an electro-optical device that forms an optical image using the light emitted from the light source according to image information;
    a projection lens that enlarges and projects the image formed by the electro-optical device;
    a fan that draws external air into a main body or for exhausting air inside the main body to an outside of the main body;
    an outer casing that covers the main body; and
    a light source-replacement cover that serves as a part of the outer casing, the light source being attachable to and removable from the main body via the light source-replacement cover, the light source-replacement cover including said fan integrally mounted thereto and a ventilation hole provided therein for drawing in or exhausting air.

2. The projector according to claim 1, the light source-replacement cover being formed by a heat insulating material, and the outer casing, with exception of the light source-replacement cover, being made of metal.

3. The projector according to claim 1, a direction of insertion and extraction of a connector on a side of a power supply and a connector on a side of the light source provided in the main body being in a same direction of attachment and detachment of the light source to and from the main body.

4. The projector according to claim 2, a direction of insertion and extraction of a connector on a side of a power supply and a connector on a side of the light source provided in the main body being in a same direction of attachment and detachment of the light source to and from the main body.

5. The projector according to claim 1, an electric power-supplying line to the fan being electrically disconnected and connected according to opening and closing of the light source-replacement cover, respectively.

6. The projector according to claim 2, an electric power-supplying line to the fan being electrically disconnected and connected according to opening and closing of the light source-replacement cover, respectively.

7. The projector according to claim 3, an electric power-supplying line to the fan being electrically disconnected and connected according to opening and closing of the light source-replacement cover, respectively.

8. The projector according to claim 4, an electric power-supplying line to the fan being electrically disconnected and connected according to opening and closing of the light source-replacement cover, respectively.

9. The projector according to claim 1, the fan being provided with a fan guard on an opposite side of the light source-replacement cover.

10. The projector according to claim 2, the fan being provided with a fan guard on an opposite side of the light source-replacement cover.

11. The projector according to claim 3, the fan being provided with a fan guard on an opposite side of the light source-replacement cover.

12. The projector according to claim 4, the fan being provided with a fan guard on an opposite side of the light source-replacement cover.

13. A projector, comprising:

a light source that emits light;

an electro-optical device that forms an optical image by the light emitted from the light source according to image information;

a projection lens that enlarges and projects the image formed by the electro-optical device;

a fan that draws external air into a main body or exhausts air inside the main body to an outside of the main body;

an outer casing that covers the main body; and a light source-replacement cover that serves as a part of a side face outer casing, the light source being attachable to and removable from the main body via the light source-replacement cover, the light source-replacement cover including said fan integrally mounted thereto and a ventilation hole provided therein for drawing in or exhausting air.

14. The projector according to claim 13, the light source-replacement cover being formed by a heat insulating material, and the outer casing, with exception of the light source-replacement cover, being made of metal.

15. The projector according to claim 13, a direction of insertion and extraction of a connector on a side of a power supply and a connector on a side of the light source provided in the main body being in a same direction of attachment and detachment of the light source to and from the main body.

16. The projector according to claim 14, a direction of insertion and extraction of a connector on a side of a power supply and a connector on a side of the light source provided in the main body being in a same direction of attachment and detachment of the light source to and from the main body.

17. The projector according to claim 13, an electric power-supplying line to the fan being electrically disconnected and connected according to opening and closing of the light source-replacement cover, respectively.

18. The projector according to claim 14, an electric power-supplying line to the fan being electrically disconnected and connected according to opening and closing of the light source-replacement cover, respectively.

19. The projector according to claim 15, an electric power-supplying line to the fan being electrically disconnected and connected according to opening and closing of the light source-replacement cover, respectively.

20. The projector according to claim 16, an electric power-supplying line to the fan being electrically disconnected and connected according to opening and closing of the light source-replacement cover, respectively.

21. The projector according to claim 13, the fan being provided with a fan guard on an opposite side of the light source-replacement cover.

22. The projector according to claim 14, the fan being provided with a fan guard on an opposite side of the light source-replacement cover.

23. The projector according to claim 15, the fan being provided with a fan guard on an opposite side of the light source-replacement cover.

24. The projector according to claim 16, the fan being provided with a fan guard on an opposite side of the light source-replacement cover.

* * * * *